(12) United States Patent
Lee

(10) Patent No.: US 6,804,015 B1
(45) Date of Patent: Oct. 12, 2004

(54) PAGE PRINTER AND CONTROL METHOD THEREOF

(75) Inventor: Don-Seon Lee, Kyonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 09/567,120

(22) Filed: May 8, 2000

(30) Foreign Application Priority Data

May 7, 1999 (KR) ........................................ 1999-16271

(51) Int. Cl.⁷ .............................................. G06F 15/00
(52) U.S. Cl. ..................................... 358/1.1; 358/1.13
(58) Field of Search ................................. 358/1.1, 1.13, 358/1.14, 1.15, 448, 1.16, 401, 403, 502; 382/112, 277, 286

(56) References Cited

U.S. PATENT DOCUMENTS 5,471,322 A * 11/1995 Murata ....................... 358/502
5,774,356 A * 6/1998 Hisatake et al. .............. 700/28

* cited by examiner

Primary Examiner—Twyler Lamb
(74) Attorney, Agent, or Firm—Robert E. Bushnell, Esq.

(57) ABSTRACT

A page printer receives printing data, including a form feed control character and total number of pages of printing data, and prints the printing data through a printer engine, in accordance with a method for controlling the page printer. The page printer comprises: a printing data storing part for receiving and storing the printing data; a total page number storing part for storing a total page number or count of the printing data; a counter for counting a number of form feed control characters; and a control part for controlling the printer engine to print the printing data when the number of form feed control characters counted is less than the total page number or count of the printing data.

16 Claims, 2 Drawing Sheets

PAGE PRINTER AND CONTROL METHOD THEREOF

CLAIM OF PRIORITY

This application makes reference to, incorporates the same herein, and claims all benefits accruing under 35 U.S.C. § 119 from an application for PAGE PRINTER AND METHOD FOR CONTROLLING THEREOF earlier filed in the Korean Industrial Property Office on the $7^{th}$ of May 1999 and there duly assigned Serial No. 16271/1999.

BACKGROUND OF THE INVENTION

1. Technical Field

The present invention relates generally to a page printer, and control method thereof, capable of preventing printing paper from being wasted due to damaged data.

2. Related Art

Generally, printers are divided into a dot printer, a line printer, and a page printer according to a unit of printed data. In page printers, prior to performance of printing work by the printer engine, a printing image of one page is first selected, a sheet of printing paper is supplied as a printing command is received, and the selected one page is printed at that time. Printers using the electrophotographic method belong to this category of page printer.

Printing data that is created in an application program of a computer is printed in a unit of a page through the following procedure. When there is a printing request from an application program of a computer, a printer driver receives printing data to be printed, converts the printing data into a command language, for example, printer control language (PCL), and then transmits the converted command language corresponding to one page, to the printer. The page printer receives the converted command language through a video controller from the host computer, decodes the converted command language, and prints the decoded printing data through the printer engine.

The printer driver, as described previously, converts the printing data to the printing command language in a unit of a page, adds a form feed control character (in case of PCL, hexadecimal 0C) informing of the end of a page to end the converted printing data, and transmits it. Then, the video controller of the printer classifies the printing data transmitted from the host computer in a unit of a page according to the form feed control character added to the printing data, and then prints the classified one page of printing data on a printing page of one sheet.

Sometimes, a problem occurs in that the printing data is damaged due to an external cause, such as a problem in the transmission cable, and the damaged data is transmitted to the video controller.

Especially, when more than one character in the printing data converted into the printing command language are converted into a form feed control character, the video controller of the printer perceives the form feed control character of the converted printing data as the end of one page, and continues to supply printing paper, and thereby there occurs a problem in that damaged data is printed. As a result, printing paper is wasted.

SUMMARY OF THE INVENTION

Therefore, an object of the present invention is to provide a new page printer which can prevent printing paper from being wasted due to damaged data by performing a printing job until a total number of pages to be printed is the same as a counted number of form feed control characters.

A further object of the present invention is to provide a control method for a new page printer which can prevent printing paper from being wasted due to damaged data by performing a printing job until a total number of pages to be printed is the same as a counted number of form feed control character characters.

These and other objects of the present invention may be achieved by a page printer for receiving printing data, including a form feed control character and total number of pages of printing data, and printing the printing data through a printer engine, the page printer comprising: a printing data storing part for receiving and storing the printing data; a total page number storing part for storing total number of page of printing data; a counter for counting a number of form feed control characters; and a control part for controlling the printer engine to print the printing data when the number of form feed control characters counted is less than the total number of pages printed.

Alternatively, when the number of form feed control characters counted is greater than the total number of pages of printing data, the control part stores the input printing data and then resets the printing data storing part.

According to another aspect of the present invention, there is provided a method for controlling a page printer for receiving printing data, including a form feed control character and total number of pages of the printing data, and printing the printing data through a printer engine, the method comprising the steps of: receiving a total number of pages of the printing data; storing the total page number; counting a number of form feed control characters; and printing the printing data when the number of form feed control characters counted is less than the total number of pages printed.

Alternatively, when the number of form feed control characters counted is greater than the total number of pages of printing data, the input printing data is stored and then is reset.

To achieve these and other objects in accordance with the principles of the present invention, as embodied and broadly described, the present invention provides an image forming apparatus, comprising: a first memory receiving and storing print data; a second memory storing a total number of pages corresponding to the print data; a counter counting form feed control characters received; a printer engine conveying images onto recordable media, the images corresponding to the print data; and a controller controlling said printer engine to convey the images onto the recordable media when a total number of the counted form feed control characters is less than the total number of pages.

To achieve these and other objects in accordance with the principles of the present invention, as embodied and broadly described, the present invention provides a method of controlling an image forming apparatus, the method comprising: receiving and storing print data; receiving and storing a value corresponding to a total number of pages of print data; counting form feed control characters received; when a total number of the counted form feed control characters is less than the stored value, conveying images onto recordable media, the images corresponding to the print data.

To achieve these and other objects in accordance with the principles of the present invention, as embodied and broadly described, the present invention provides a page printer apparatus, comprising: a first memory receiving and storing print data; a second memory storing a total number of pages corresponding to the print data; a counter counting form feed control characters received; a printer engine conveying images onto recordable media, the images corresponding to the print data; and a controller controlling said printer engine to convey the images onto the recordable media when a total number of the counted form feed control characters is less than the total number of pages; said printer engine not conveying the images onto the recordable media when the total number of the counted form feed control characters is greater than the total number of pages.

The present invention is more specifically described in the following paragraphs by reference to the drawings attached only by way of example. Other advantages and features will become apparent from the following description and from the claims.

BRIEF DESCRIPTION OF THE DRAWINGS

In the accompanying drawings, which are incorporated in and constitute a part of this specification, embodiments of the invention are illustrated, which, together with a general description of the invention given above, and the detailed description given below, serve to exemplify the principles of this invention.

DETAILED DESCRIPTION OF THE PREFERRED EMBODIMENTS

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Figure 1:
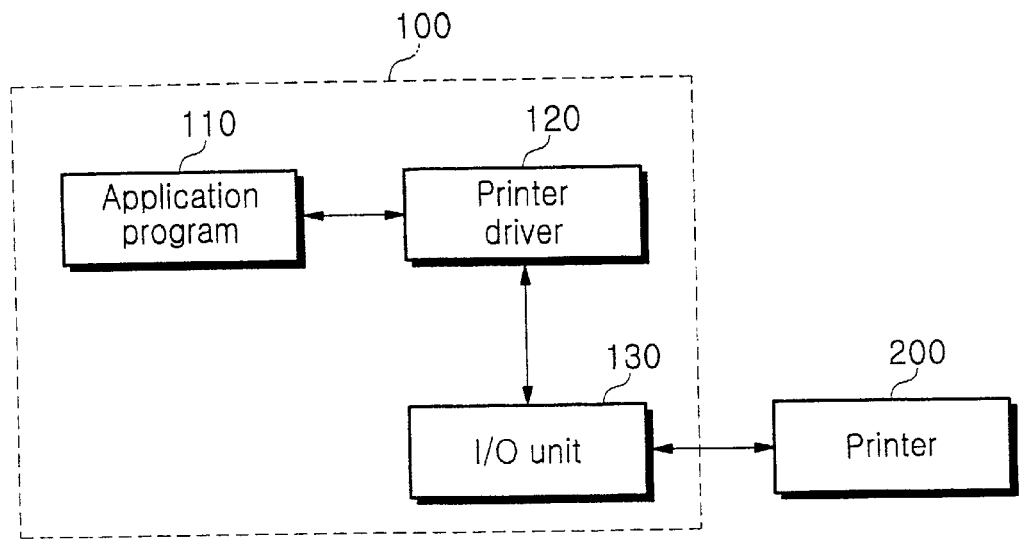
FIG. 1 is a block diagram showing a printing environment, in accordance with the principles of the present invention.

Turning now to the drawings, FIG. 1 is a block diagram showing a printing environment in accordance with the present invention. Referring to FIG. 1, a computer 100 that creates printing data, including a form feed control character, communicates with a page printer 200. Here, the form feed control character is provided for the distinction of pages of the printing data. The computer 100 includes: an application program 110 adapted for the creation of printing data; a printer driver 120 that receives printing data to be printed, converts the printing data into a command language that is understood by the printer 200, and then adds the converted command language to the form feed control character representing an end of the page; and an input/output (I/O) unit 130 that transmits the converted one page data to the printer 200, and simultaneously receives status information from the printer 200.

The printer 200 is connected to the input/output (I/O) unit 130 and prints the printing data corresponding to one page. The printer driver 120 measures the total number of pages of the printing data to be printed, and then transmits the measured total page count to the printer 200 through the input/output (I/O) unit 130. Here, the technology measuring the total page count by means of the printer driver 120 is general, and thus the description thereof is intentionally omitted.

Figure 2:
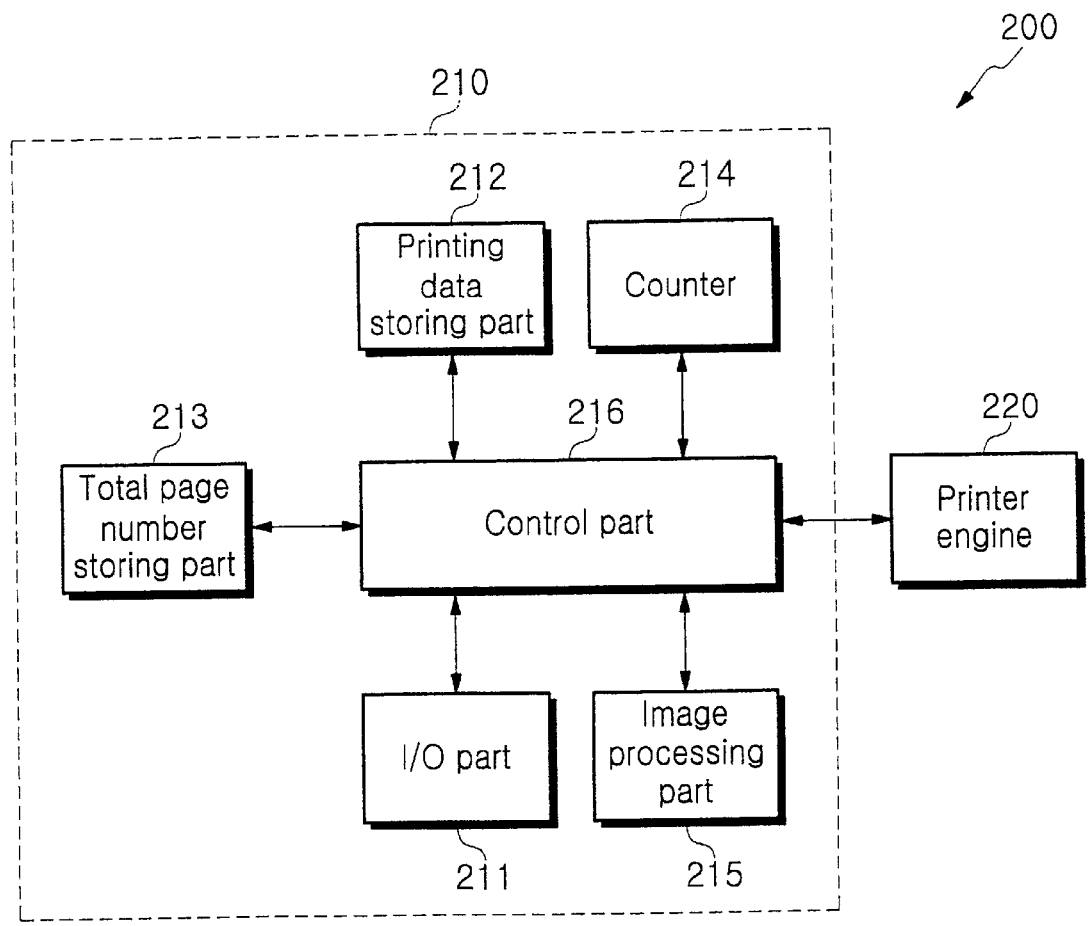
FIG. 2 is a block diagram showing a page printer, in accordance with the principles of the present invention.

Referring to FIG. 2, the page printer 200 includes: a video controller 210 for decoding printing data of one page transmitted from the computer 100, and for controlling the printing job; and a printer engine 220 for performing the printing job according to the control exerted by the video controller 210.

The video controller 210 transfers the status information of the computer 100 through an input/output (I/O) part 211, receives the printing data and the total page count of the printing data, and stores the printing data and the total page count in a printing data storing part 212 and a total page number storing part 213, respectively.

A counter 214 of the video controller 210 counts a number of form feed control characters contained in the printing data, and an image processing part 215 image-processes the printing data, and transmits and prints the printing data.

A control part 216 controls all elements of both the video controller 210, and especially controls the printer engine 220 to print the printing data when the number of form feed control characters counted is equal to or less than the total page count of the printing data.

Alternatively, when the counted number of form feed control characters is greater than the total pages of the printing data, the control part 216 stores the input printing data and then resets the printing data storing part 212. An error condition exists when the counted number of form feed control characters is greater than the total pages of the printing data. The error condition probably indicates the presence of corrupted printing data or faulty printing data.

It is likely that paper would be wasted if the faulty printing data were to be printed onto paper. After the faulty printing data was printed onto paper, a user would probably choose to discard or recycle that paper. In order to avoid such a waste of paper, the printer according to the principles of the present invention does not print the faulty printing data onto paper. Instead, the faulty printing data is erased from the storing part 212. The erasure occurs when the storing part 212 is reset. Other recordable media can be used in lieu of paper.

Figure 3:
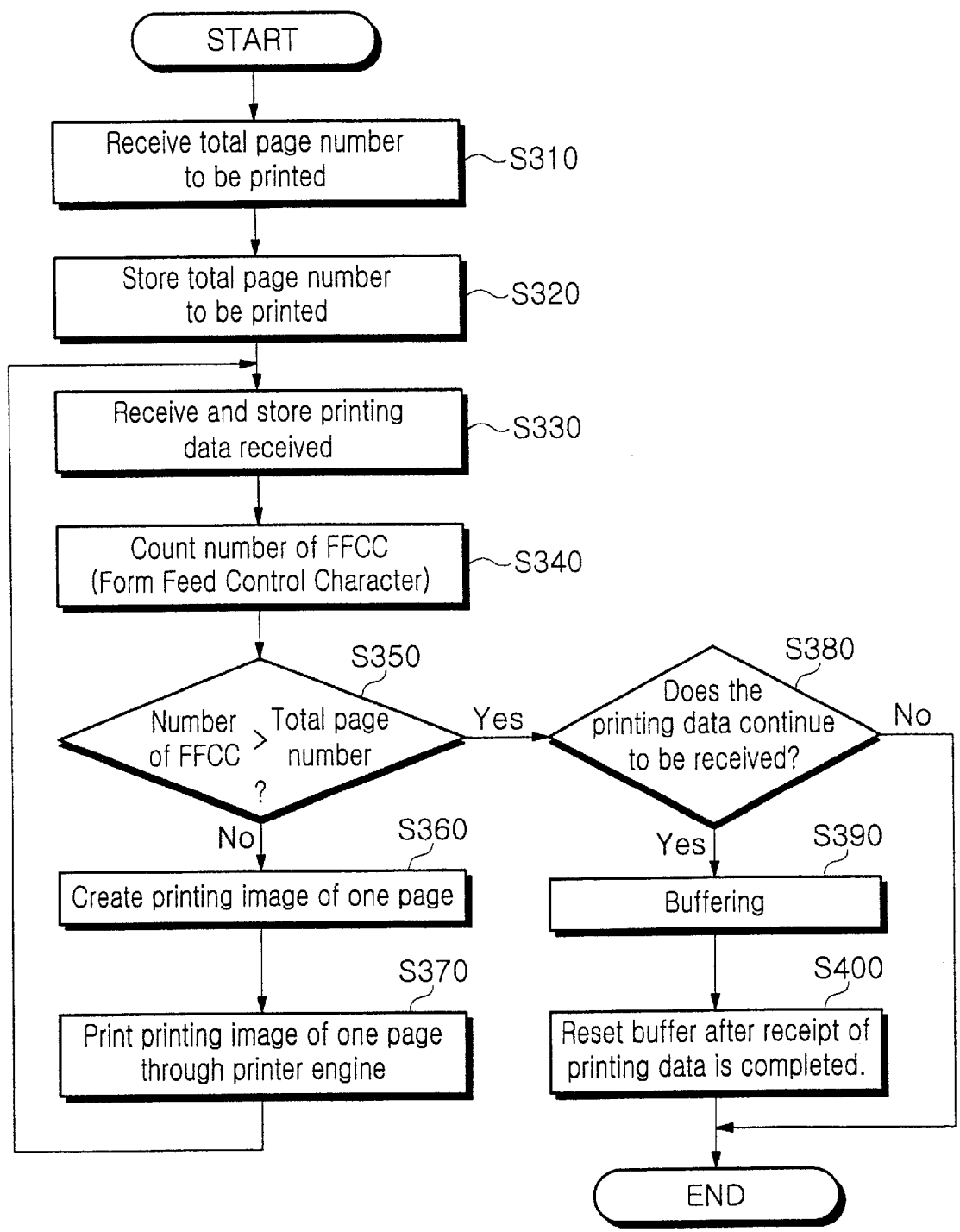
FIG. 3 is a flow chart for describing a control method of the page printer of FIG. 2, in accordance with the principles of the present invention.

Next, a printing data processing procedure according to a control method applied to the page printer of FIG. 2 is described with reference to the accompanying drawings of FIGS. 2 and 3. At step S310, the control part 216 of the video controller 210 receives a total page number or count of the printing data through the input/output (I/O) part 211. At step S320, the control part 216 of the video controller 210 stores the total page number or count in the total page number storing part 213. The total page number or count stored corresponds to a value received through the input/output part 211. At step S330, the control part 216 also receives the printing data through the I/O part 211 from the computer 100, and temporarily stores the printing data in the printing data storing part 212.

Subsequently, at step S340, the control part 216 counts the number of form feed control characters (FFCC) contained in the printing data. Thereafter, at step S350, it is determined whether the number of form feed control characters is greater than the total page number or count of the printing data.

At step S360, as a result of the determination in step S350, when the number of form feed control characters is not greater than the total page number or count of the printing data, the control part 216 creates a printing image through the image processing part 215 from the input printing data. Next, at step S370, the printing image of one page is printed by the printer engine 220.

At step S380, as a result of the determination in step S350, when the number of the counted form feed control characters is greater than the total page number or count, the control part 216 determines whether the printing data is continuing to be received from the computer 100. At step S390, when it is determined that the printing data is continuing to be received from the computer 100, the control part 216 receives all the printing data, and stores all the printing data in the printing data storing part 212. At step S400, the control part 216 resets the printing data storing part 212 to delete all the stored printing data.

The printing data storing part 212 corresponds to a memory storing information. The total number storing part 213 corresponds to a memory storing information. The control part 216 can correspond to a central processing unit or a controller.

As described previously, the printing work is performed until the total printing page number or count becomes less than or equal to the number of counted form feed control characters, and thereby waste of the printing paper due to damage of the printing data is prevented. In other words, the actual printing onto paper is not performed until the total printing page number or count becomes less than or equal to the number of counted form feed control characters, and thus a waste of paper due to damaged print data is prevented.

The foregoing paragraphs describe the details of the present invention, which relates generally to a page printer and control method thereof. More particularly, the foregoing paragraphs describe the details of the present invention, which relates to a page printer and control method thereof capable of preventing printing paper from being wasted due to damaged data by performance of a printing job until a total page number or count to be printed becomes equal to a counted number of form feed control characters.

This invention has been described above with reference to the aforementioned embodiments. It is evident, however, that many alternative modifications and variations will be apparent to those having skill in the art in light of the foregoing description. Accordingly, the present invention embraces all such alternative modifications and variations as fall within the spirit and scope of the appended claims.

While the present invention has been illustrated by the description of embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departing from the spirit or scope of the applicant's general inventive concept.

What is claimed is:

1. An image forming apparatus, comprising:
a first memory receiving and storing print data;
a second memory storing a total number of pages corresponding to the print data;
a counter counting form feed control characters received;
a printer engine conveying images onto recordable media, the images corresponding to the print data; and
a controller controlling said printer engine to convey the images onto the recordable media when a total number of the counted form feed control characters is less than the total number of pages;
said printer engine not conveying the images onto the recordable media when the total number of the counted form feed control characters is greater than the total number of pages.

2. An image forming apparatus, comprising:
a first memory receiving and storing print data;
a second memory storing a total number of pages corresponding to the print data;
a counter counting form feed control characters received;
a printer engine conveying images onto recordable media, the images corresponding to the print data; and
a controller controlling said printer engine to convey the images onto the recordable media when a total number of the counted form feed control characters is less than the total number of pages;
wherein, when the total number of the counted form feed control characters is greater than the total number of pages, said controller receives the print data, stores the print data in said first memory, and resets said first memory to delete the print data.

3. The apparatus of claim 2, said controller controlling said printer engine to convey the images onto the recordable media when a total number of the counted form feed control characters is not greater than the total number of pages.

4. The apparatus of claim 2, said image forming apparatus corresponding to a page printer.

5. The apparatus of claim 2, said second memory receiving the total number of pages corresponding to the print data.

6. The apparatus of claim 2, said first memory corresponding to a print data storing part, said second memory corresponding to a total page number storing part.

7. An image forming apparatus, comprising:
a first memory receiving and storing print data;
a second memory storing a total number of pages corresponding to the print data;
a counter counting form feed control characters received;
a printer engine conveying images onto recordable media, the images corresponding to the print data; and
a controller controlling said printer engine to convey the images onto the recordable media when a total number of the counted form feed control characters is less than the total number of pages;
wherein, when the total number of the counted form feed control characters is greater than the total number of pages, said controller controls said printer engine to not convey the images onto the recordable media.

8. A method of controlling an image forming apparatus, the method comprising the steps of:
receiving and storing print data;
receiving and storing a value corresponding to a total number of pages of print data;
counting form feed control characters received;
when a total number of the counted form feed control characters is less than the stored value, conveying images onto recordable media, the images corresponding to the print data; and
when a total number of the counted form feed control characters is greater than the stored value, determining that an error condition exists and not conveying the images onto the recordable media.

9. The method of claim 8, said storing of the print data corresponding to storing the print data in a first memory.

10. The method of claim 8, further comprising the step of:

conveying images onto the recordable media when a total number of the counted form feed control characters is not greater than the stored value.

11. The method of claim 8, said image forming apparatus corresponding to a pager printer.

12. A method of controlling an image forming apparatus, the method comprising the steps of:

receiving and storing print data;

receiving and storing a value corresponding to a total number of pages of print data;

counting form feed control characters received; and when a total number of the counted form feed control characters is less than the stored value, conveying images onto recordable media, the images corresponding to the print data;

said storing of the print data corresponding to storing the print data in a first memory; and said method further comprising the step of storing all print data in said first memory and then resetting said first memory when a total number of the counted form feed control characters is greater than the stored value;

said resetting of said first memory corresponding to deleting the print data from said first memory.

13. A method of controlling an image for forming apparatus, the method comprising the steps of:

receiving and storing print data;

receiving and storing a value corresponding to a total number of pages of print data;

counting form feed control characters received; and when a total number of the counted form feed control characters is less than the stored value, conveying images onto recordable media, the images corresponding to the print data;

wherein said storing of the print data corresponds to storing the print data in a first memory, and wherein an error condition exists when a total number of the counted form feed control characters is greater than the stored value.

14. A page printer apparatus, comprising:

a first memory receiving and storing print data;

a second memory storing a total number of pages corresponding to the print data;

a counter counting form feed control characters received;

a printer engine conveying images onto recordable media, the images corresponding to the print data; and a controller controlling said printer engine to convey the images onto the recordable media when a total number of the counted form feed control characters is less than the total number of pages;

said printer engine not conveying the images onto the recordable media when the total number of the counted form feed control characters is greater than the total number of pages.

15. The apparatus of claim 14, said controller storing all the print data in said first memory and then deleting the print data from said first memory when the total number of the counted form feed control characters is greater than the total number of pages.

16. The apparatus of claim 14, the form feed control characters and a value corresponding to the total number of pages being transmitted to said page printer with the print data.

* * * * *